(12) United States Patent
Kershaw et al.

(10) Patent No.: US 8,473,819 B2
(45) Date of Patent: Jun. 25, 2013

(54) ERROR MANAGEMENT

(75) Inventors: Daniel Kershaw, Cambridge (GB);
David Michael Bull, Cambridge (GB);
Mladen Wilder, Cambridge (GB)

(73) Assignee: ARM Limited, Cambridge (GB)

( * ) Notice: Subject to any disclaimer, the term of this patent is extended or adjusted under 35 U.S.C. 154(b) by 140 days.

(21) Appl. No.: 12/737,475

(22) PCT Filed: Jul. 15, 2009

(86) PCT No.: PCT/GB2009/001751
§ 371 (c)(1),
(2), (4) Date: Mar. 24, 2011

(87) PCT Pub. No.: WO2010/007367
PCT Pub. Date: Jan. 21, 2010

(65) Prior Publication Data
US 2011/0185262 A1   Jul. 28, 2011

(30) Foreign Application Priority Data

Jul. 16, 2008   (GB) .................................. 0813027.0

(51) Int. Cl.
*H03M 13/00*   (2006.01)
(52) U.S. Cl.
USPC .......................................... 714/776; 714/814
(58) Field of Classification Search
USPC .......................................... 714/776, 814, 815
See application file for complete search history.

(56) References Cited

U.S. PATENT DOCUMENTS

| | | | |
|---|---|---|---|
| 2002/0057713 A1* | 5/2002 | Bagchi et al. ................. | 370/468 |
| 2007/0116132 A1* | 5/2007 | Fediakine et al. ............. | 375/242 |
| 2009/0083606 A1* | 3/2009 | Choi et al. .................... | 714/776 |

FOREIGN PATENT DOCUMENTS

| | | |
|---|---|---|
| WO | WO 2004/001545 | 12/2003 |
| WO | WO 2004/084072 | 9/2004 |
| WO | WO 2004084072 A1 * | 9/2004 |
| WO | WO 2006/023239 | 3/2006 |

OTHER PUBLICATIONS

International Search Report for PCT/GB2009/001751, mailed Dec. 9, 2009.

(Continued)

*Primary Examiner* — Yolanda L Wilson
(74) *Attorney, Agent, or Firm* — Nixon & Vanderhye, P.C.

(57) ABSTRACT

An electronic device is described which receives data from a transmitting device via a communications channel. The electronic device comprises digital processing circuitry arranged to process the data received via the communications channel to generate output data, error detection circuitry arranged to detect errors in the output data, and monitoring circuitry arranged to monitor the quality of digital processing conducted by the digital processing circuitry and generate digital performance data indicative of the monitored quality of digital processing. The electronic device also comprises control circuitry responsive to error information comprising errors detected by the error detection circuitry and the performance data generated by the monitoring circuitry to modify the operation of one or both of the transmitting device and the electronic device. The digital performance data provides the control circuitry with additional information for use in identifying where errors in signal processing are arising, enabling an informed decision be made to modify the operation of either the transmitting device or receiving device in some way, either to reduce the occurrence of errors in the output signal or to improve the speed and/or efficiency of the transmitter and/or receiver.

20 Claims, 8 Drawing Sheets

OTHER PUBLICATIONS

International Preliminary Report on Patentability for PCT/GB2009/001751, dated May 13, 2010.

Kuang et al., Soft Digital Signal Processing Using Self-Timed Circuits, ICSE2002 Proc. 2002, Penang, Malaysia, pp. 194-198.

Kavčić et al., Iterative, Soft Signal Processing for Digital Communications, IEEE Signal Processing Magazine, Jan. 2004, pp. 26-27 and 108.

* cited by examiner

| Clock Cycle | 1 | 2 | 3 | 4 | 5 | 6 | 7 | 8 | 9 | 10 |
|---|---|---|---|---|---|---|---|---|---|---|
| Node | | | | | | | | | | |
| A | 0 | 0 | 1 | 1 | 0 | 1 | 0 | 0 | 0 | 0 |
| B | 0 | 0 | 0 | 0 | 0 | 0 | 0 | 0 | 0 | 0 |
| C | 1 | 0 | 1 | 1 | 0 | 1 | 1 | 1 | 1 | 0 |
| " | | | | | | | | | | |
| " | | | | | | | | | | |
| Z | 0 | 0 | 1 | 0 | 0 | 0 | 0 | 1 | 0 | 0 |

Table 1: Captured statistics

FIG. 5A

| Node | Magnitude Weighting |
|---|---|
| A | 3 |
| B | 2 |
| C | 1 |
| " | |
| " | |
| Z | 1 |

Table 2: Metric Weightings

ERROR MANAGEMENT

This application is the U.S. national phase of International Application No. PCT/GB2009/001751 filed 15 Jul. 2009, which designated the U.S. and claims priority to GB Application No. 0813027.0 filed 16 Jul. 2008, the entire contents of each of which are hereby incorporated by reference.

FIELD OF INVENTION

The present invention relates to error management. More particularly, embodiments of the present invention relate to a receiving apparatus and method within a communications system which are responsive to detected errors to modify the operation of the communications system.

BACKGROUND

In a communications system, when a data signal is transmitted from a transmitter to a receiver, errors may be introduced into the data signal at several stages. In particular, there are three main stages which can be considered, these being the transmission channel (wired or wireless) between the transmitter and the receiver, the analogue circuitry of the receiver, and the digital circuitry of the receiver. For example, the transmission channel, which may be wired or wireless, may introduce noise or distortion (such as multipath distortion resulting from the interference of multiple reflections of the transmitted signal) into the data signal due to noise sources and interference, transmission medium irregularities, and attenuation of the data signal. Furthermore, the analogue circuitry of the receiver, which will typically perform functions such as analogue signal amplification, frequency conversion and analogue to digital conversion, may also introduce noise into the data signal. In either case these effects result in a loss of some of the data carried in the data signal. The digital circuitry on the other hand is typically considered to operate correctly, and is assumed not to introduce errors into a received digital signal.

Communications protocols commonly employ mechanisms such as Automatic Repeat reQuest (ARQ), Hybrid ARQ (HARQ), Forward Error Correction (FEC), the addition of explicit integrity checks such as Cyclic Redundancy Checks (CRCs) to permit estimates of correctness to be made by a data receiver, and interleaving to mitigate the effects of noise and the like in either the transmission medium, or the associated analogue circuitry. This renders the receiver tolerant to certain transmission or processing errors, either by correcting the result using redundant information, or by rejecting the result as being incorrect.

Iterative processing techniques for probability measurements of data bits being a one (1) or a zero (0) are described in "Iterative, Soft Signal Processing for Digital Communications" (Alek Kavcic, José M. F. Moura, Vijayakumar Bhagavatula; http://www.ece.cmu.edu/~moura/papers/spm-jan04-kavcic-moura-kumar-ieeeexplore.pdf).

A self-timed architecture for low power digital signal processing is described in "Soft Digital Signal Processing Using Self-Timed Circuits" (Kuang, Yang) which uses self-timed circuits, which are robust at very low voltage, to allow the circuit to operate with a very low supply voltage, even if some data samples are missed due to this low voltage.

The Razor processor described in (WO-A-2004/084072) comprises error detection circuitry which detects digital processing errors and modifies the operating characteristics of the processor in dependence on a detected error rate.

SUMMARY

According to one aspect of the present invention, there is provided an electronic device for receiving data from a transmitting device via a communications channel, the electronic device comprising:

digital processing circuitry arranged to process the data received via the communications channel to generate output data;

error detection circuitry arranged to detect errors in the output data;

monitoring circuitry arranged to monitor the quality of digital processing conducted by the digital processing circuitry and generate digital performance data indicative of the monitored quality of digital processing; and control circuitry responsive to error information comprising errors detected by the error detection circuitry and the performance data generated by the monitoring circuitry to modify the operation of one or both of the transmitting device and the electronic device.

The digital performance data provides the control circuitry with additional information for use in identifying where errors in the signal processing chain (e.g. RF channel, analogue circuitry and digital circuitry) are arising, enabling the control circuitry to make an informed decision to modify the operation of either the transmitting device or receiving device in some way, either to reduce the occurrence of errors in the output signal (if the error detection circuitry indicates that the number and type of errors in the output signal is too great) or to improve the speed and/or efficiency of the transmitter and/or receiver (if the error detection circuitry indicates that more errors can be tolerated). In this way, the performance of the transmitting device or receiving device can be improved and errors can be managed.

The data transmitted from the transmitting device via the communications channel may be packetized data comprising error correction codes (redundant information). In this case, the electronic device may comprise error correction circuitry for correcting errors in the output data using the error correction codes. The error correction codes enable the system to cope with imperfections in the received and processed signal caused by noise and distortion in one or more of the transmission medium (wired or wireless) through which the packet was transmitted, the analogue front end circuitry of the receiver, and the digital processing circuitry. The error detection circuitry in this case may be arranged to detect whether a packet of the corrected output data is correct or in error. The error correction circuitry may be arranged to generate error metrics indicative of severity of errors in the digital signal being corrected, in which case the error information used by the control circuitry comprises the error metrics generated by the error correction circuitry. It will be appreciated that the error correction mechanism provided by the error correction circuitry may be sufficient to correct errors in certain types of digital processing used by the receiver as part of the communication.

The electronic device may comprise analogue circuitry arranged to receive the data transmitted from the transmitting apparatus via the communications channel in analogue form, convert the received analogue data into digital form, and provide the data in digital form to the digital processing circuitry. The digital processing circuitry may comprise a channel estimator arranged to estimate channel characteristics of the communications channel and the analogue circuitry and provide the estimated channel characteristics to the control circuitry. In this case, the error information comprises the estimated channel characteristics. The control circuitry may be responsive to the error information to modify an operating parameter of at least a portion of the analogue circuitry.

The present technique recognises that tolerance to errors provided by the redundancy in the system can be utilised to enable the transmitting apparatus or the receiving apparatus of the communications system to be operated outside of their guaranteed error free operational parameters. Deliberately operating digital circuits outside of their guaranteed error free operational parameters can be used to save power (for example by using a lower voltage), however errors in processing may result. A communications system which uses one mechanism to be tolerant of multiple sources of error (for example the transmission medium, any analogue circuitry of the receiver and the digital circuitry of the receiver) may benefit from an indication of the likely source of such errors in order to take the most appropriate action. For example if it is likely that a large number of errors occurred in digital signal processing, then it is likely to be more efficient to re-process the existing raw packet, than for the packet to be re-sent.

The control circuitry may be responsive to the error information to modify an operating parameter of at least a portion of the digital processing circuitry. The modified operating parameter may be one of an operating voltage and a clock frequency of the digital processing circuitry. For example, the control circuitry may be arranged to reduce the operating voltage and/or increase the clock frequency of the digital processing circuitry when the error information indicates that this will not cause an unacceptable error rate in the output data.

The control circuitry may also be responsive to the error information to modify data transmission parameters used by the transmitting device to transmit the data via the communications channel. For example, the data transmission parameter modified by the control circuitry may be one of a data transmission rate and a mode parameter for selecting between a single antennae transmission mode and a multiple antennae transmission mode.

The control circuitry may be responsive to the error information to request the transmitting device to re-send data. Alternatively, the control circuitry may be responsive to the error information to control the digital processing circuitry to reprocess data. The selection of which of these two options should be pursued will depend upon whether the errors are considered to have arisen in the RF channel, the analogue circuitry or the digital circuitry, and the available options for modifying the parameters of the transmitting device, the analogue circuitry and the digital circuitry.

In one example, the control circuitry is responsive to error information indicating that the corrected data packet is in error to control the digital circuitry to reprocess the data packet if the estimated channel characteristics indicate an acceptable channel quality. Optionally, the control circuitry may control the digital circuitry to reprocess the data packet using modified operating parameters if the digital performance data indicates an unacceptable quality of digital processing.

In another example, the control circuitry is responsive to error information indicating that the corrected data packet is in error to request transmission of a replacement data packet from the transmitting device if the estimated channel characteristics indicate an unacceptable channel quality and the digital performance data indicates an acceptable quality of digital processing. Optionally, the control circuitry may request transmission of a replacement data packet from the transmitting device using modified transmission parameters.

The monitoring circuitry may monitor the quality of digital processing by detecting timing errors in the digital processing circuitry and generating the digital performance data based on the number of detected timing errors. The digital performance data may also be generated based on the temporal and/or spatial distribution of the detected timing errors. For example, the monitoring circuitry may detect timing errors at certain critical paths within the digital circuitry, and errors occurring on certain paths may be considered more severe than errors on other paths. Furthermore, isolated errors may not be considered to be a problem, but an accumulation of multiple errors on the same critical path might be considered to cause severe degradation in performance.

In the present technique, error detection circuits similar to those used for Razor (WO-A-2004/084072) can be used to generate the metrics giving an indication of the quality of digital processing (for example the error rate above a certain threshold and/or the temporal distribution of errors).

According to another aspect of the present invention, there is provided a receiving method of receiving data at an electronic device from a transmitting device via a communications channel, the method comprising the steps of:

digitally processing the data received via the communications channel to generate output data;

monitoring the quality of digital processing and generating digital performance data indicative of the monitored quality of digital processing;

detecting errors in the output data; and modifying the operation of one or both of the transmitting device and the electronic device responsive to error information comprising detected errors in the output data and the digital performance data.

In communication systems, it is accepted that the medium used to transport signals carrying information is to varying degrees imperfect, and as such introduces noise into those signals. As discussed above, communications protocols commonly employ techniques such as ARQ, HARQ, Forward Error Correction (FEC), and interleaving to mitigate noise introduced by both analogue processing techniques, and the communication medium, and add explicit integrity checks such as Cyclic Redundancy Checks (CRCs) to permit estimates of correctness to be made by a data receiver.

Given the specific nature of the transport medium, and analogue processing circuitry, and the possible sources of noise it is possible to create one or more such checks, which can effectively serve to guarantee the integrity of a particular item of data if so required. For example a user of a mobile phone sending a text message will always expect that, if the message can be sent, and received, then it will be received without errors. In order to achieve this, modern communications systems implement various forms of Automatic Repeat reQuest (ARQ/HARQ), which provide a mechanism for requesting a packet of data be resent should errors be found by checking the CRC code after forward error correction. In this way, if the forward error correction should be unable to correct an error in a packet of data, this will be detected (using the CRC code) and a new packet requested.

It is common for communication devices to use the error tolerance provided by error correction techniques to enable the use of a range of adaptive techniques to optimise for a range of factors in a particular environment. For example, mobile communication devices will typically incorporate adaptive mechanisms to maximise battery life, as well as other attributes such as latency or throughput, for example trading off the numbers of packets received/transmitted with error rate.

Both analogue and digital circuits are typically used in communication devices, with the digital circuits used to perform both control and data-plane processing. Razor is one technique which can be used to optimise the efficiency of the digital circuits, which uses additional circuits to detect timing errors. Soft digital signal processing is another technique, which makes use of specific noise tolerances for given algorithms, such as filters to operate digital circuits at a non-zero error rate. Both of these techniques require explicit monitoring circuits which determine whether the output of the circuit is acceptable, and initiate some action in the event the error is not acceptable, for example repeating the processing operation, or substituting an alternative value.

The nature of the system integrity checks used to tolerate noise in the transport medium, or analogue processing circuits, is such that they can also be used to tolerate errors in selected digital processing circuits, where the errors can be considered as an additional noise source. In such a system the noise injected due to timing errors may not necessarily result in a corrupted data packet, due to the inherent redundancy present in the communication system.

In the event of a corrupt packet being detected, it may however be beneficial to determine whether or not any timing errors were present during processing, as this information can be used to determine the best course of action. For example the raw packet could be re-processed using different operational parameters for the digital circuits, or a request could be made for the packet to be re-transmitted. Any information regarding timing errors does not have to be precise, as a system can be constructed which makes use of probabilistic timing error information, which relaxes the requirements on the error detection circuits used. Such probabilistic information can be regarded of a "quality of service" indicator for digital processing.

The present technique seeks to significantly reduce the engineering burden in applying circuit level timing speculation techniques to processors such as the Neon processor developed by ARM Limited, Cambridge, United Kingdom, running radio based protocol software, where the design is dominated by a clearly defined data path, and where errors in processing can be tolerated due to existing data integrity checks.

Moreover, the present technique may provide a benefit of timing speculation, with minimal impact on baseline microarchitecture.

Various other aspects and features of the present invention are defined in the claims, and include a computer program product.

It will be appreciated that the circuitry referred to throughout this specification may either be dedicated circuitry or general purpose circuitry configured under software control. It will further be appreciated that while the communications channel described herein is a wireless communication channel, embodiments of the present invention would also be applicable to a wired communication channel. The electronic device may be any electronic device capable of receiving a transmitted signal, for example a mobile phone, personal digital assistant (PDA) or computer.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
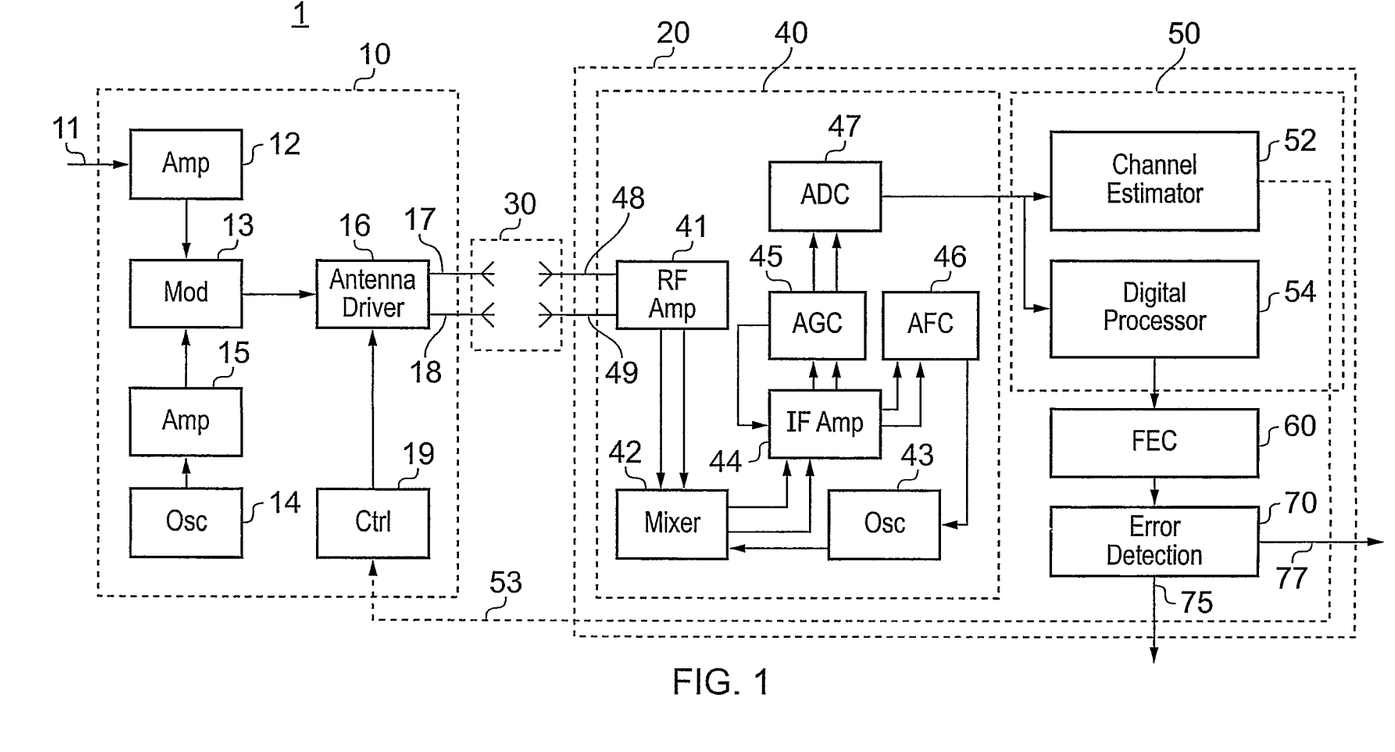
FIG. 1 schematically illustrates a communications system.

Referring to FIG. 1, an example communications system 1 is schematically illustrated. The communications system 1 comprises a transmitting apparatus 10 and a receiving apparatus 20 coupled together via a communications channel 30 which in the present case is a wireless communications channel. The transmitting apparatus 10 comprises a signal amplifier 12 which receives and amplifies an input signal 11, which may be an audio or video signal, or other data signal, and which in the present case is a packetised data signal. The amplified signal generated by the signal amplifier 12 is passed to a modulator 13. The transmitting apparatus 10 also comprises an oscillator 14 which generates a carrier signal upon which the amplified signal generated by the signal amplifier 12 is to be carried. The carrier signal generated by the oscillator 14 is then received and amplified by a carrier amplifier 15. The amplified carrier signal is then passed to the modulator 13. The modulator 13 is operable to modulate the amplified carrier signal with the amplified input signal to form a transmission signal. The transmission signal is then passed to an antenna driver 16 for transmission. The antenna driver 16 in this case is operable to drive two antennae 17 and 18 in a 2×2 Multiple-In Multiple-Out (MIMO) arrangement at a desired transmission power level and data rate to transmit two correlated transmission signals. It will be appreciated that the antenna driver 16 may also be operated in a single antennae mode, in which case one of the antennae 17 or 18 will be unused. The operation of the antenna driver 16 is configurable by a controller 19 based on channel information provided by a back channel 53 (described below).

The receiving apparatus comprises analogue front end circuitry 40, main digital circuitry 50, forward error correction (FEC) circuitry 60 and error detection circuitry 70. The analogue front end circuitry 40 comprises a radiofrequency (RF) amplifier 41 which receives and amplifies the two transmission signals received at two antennae 48, 49 in the MIMO mode. It will also be appreciated that when the MIMO mode is not being utilised, one of the antennae 48 or 49 will be unused. The transmission signal(s) generated at and transmitted from the transmitting apparatus 10 can therefore be received and subsequently processed at the receiving apparatus 40. The amplified transmission signals are then passed to a mixer 42 where they are converted to intermediate frequency (IF) signals using a reference clock signal generated by an oscillator 43. The intermediate frequency signals are then amplified at an intermediate frequency amplifier 44. The amplified intermediate frequency signals generated by the intermediate frequency amplifier 44 are passed to an automatic gain controller (AGC) 45, which forms a feedback loop with the intermediate frequency amplifier 44 to regulate the amount of amplification conducted by the intermediate frequency amplifier 44 in dependence on the signal strength. Similarly, the amplified intermediate frequency signals generated by the intermediate frequency amplifier 44 are passed to an automatic frequency controller (AFC) 46, which regulates the oscillation frequency of the oscillator 43 to control the frequency of the intermediate frequency signals generated by the mixer 42. The gain and frequency controlled signals are then passed to an analogue to digital converter (ADC) 47 for combination and conversion into digital form as a stream of data packets suitable for processing by the downstream main digital circuitry 50.

The main digital circuitry. 50 comprises a channel estimator 52 and a digital processor 54. The channel estimator serves to estimate the quality of the channel between the transmitting apparatus 10 and the input to the digital circuitry 50. It will therefore be appreciated that the estimate of the channel includes noise contributions made both by the communications channel 30 and the analogue circuitry 40 of the receiver 20. The channel estimator 52 is able to determine the nature of the channel, and in particular the channel impulse response (CIR) (by way of a low pass filter) and noise profile (by way of a high pass filter), by detecting changes in pilot symbols provided within the transmission signal transmitted from the transmitting apparatus 10. The pilot symbols are provided at known temporal and frequency positions within the transmission signal, and so by identifying distortions of the known pilot symbols it is possible to generate an estimate of the overall distortion provided by the communications channel 30 and the analogue circuitry 40. The channel estimate may then optionally be provided to the transmitting apparatus 10 via the back channel 53 (if present), which enables the controller 19 of the transmitting apparatus 10 to set the operation of the transmitting apparatus 10 in dependence on the quality of the channel. For example, the controller 19 may be response to an indication of a poor quality channel to cause the antenna driver 16 to increase the transmission power or switch from a single antennae transmission mode to a multiple antenna (MIMO) transmission mode.

The digital processor 54 may perform various generic or application specific functions. Elements of the digital processor 54 will be specific to the communications protocol being used to communicate data signals between the transmitter apparatus 10 and the receiver apparatus 20. The digital processor 54 may for example carry out functions relating to synchronisation (both symbol level and packet level) of the data signal digitized by the analogue to digital converter 47, demodulation of the data signal and extraction of information from the data signal, and packet formation.

Packets of the digitally processed signal output from the digital processor 54 are passed to a Forward Error Corrector (FEC) 60 where redundant data (for example Error Correction Codes) within each packet is utilised to correct any errors in the packet. The corrected packets of the digital signal output by the forward error corrector 60 are then tested by error detection circuitry 70 to determine whether the packet of the digital signal to be output is correct (either had no errors, or had errors which have been successfully corrected by the forward error corrector 60). The corrected packet is then output on a signal line 75, and a signal indicating whether the corrected packet is correct or in error is output on a signal line 77. In this way, downstream circuitry receiving data on the signal lines 75, 77 is able to determine how to process the packet based on the signal indicating whether it is correct or in error. For example, the downstream circuitry could choose to disregard a packet which is indicated to be in error. Furthermore, the packet error rate (the proportion of packets successfully received) can be determined over time based on this information. It will be appreciated that the above-described delineation between the analogue circuitry and the digital circuitry is not the only possible delineation. It may in some cases be viable and desirable to perform either more or less of the above described functionality in the digital circuitry.

Figure 2:
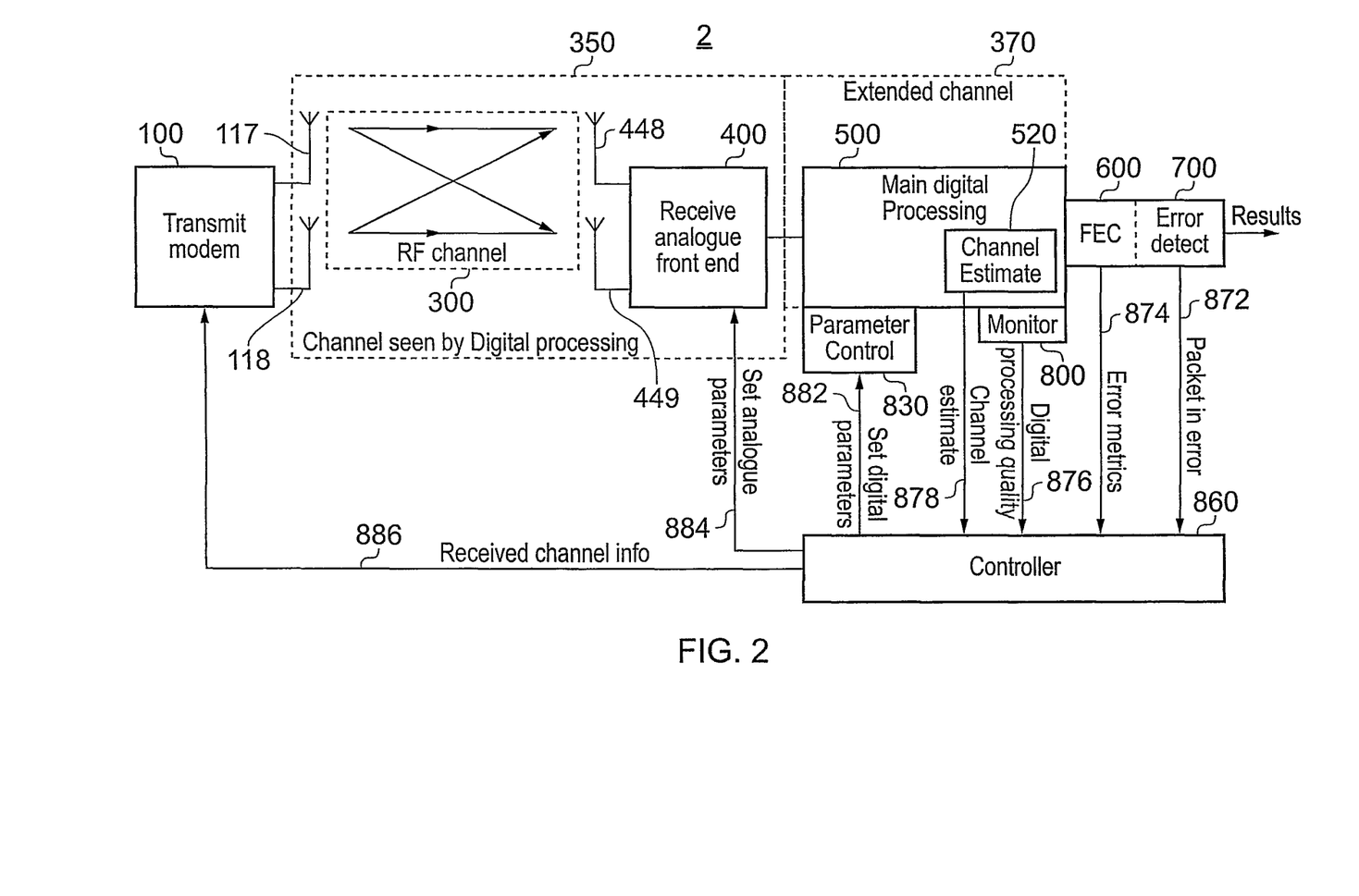
FIG. 2 schematically illustrates a communications system in which various performance measures are ascertained and the operation of either the transmitting side or the receiving side of the communications system is modified accordingly.

Referring to FIG. 2, a communications system 2 is schematically illustrated in which the various aspects of the operation of the system can be dynamically modified in dependence on various quality measures. The communications system 2 comprises a transmit modem 100 which serves as a transmitting apparatus in a similar manner to that of FIG. 1. As with the transmitting apparatus 10 of FIG. 1, the transmit modem 100 comprises two antennae 117 and 118 which enables the transmit modem 100 to operate either in a single antennae or MIMO mode as described above with reference to FIG. 1. The transmit modem 100 is operable to transmit a data signal using the antennae 117, 118 via an RF channel 300, where it can be received by antennae 448, 449 of a receiver analogue front end 400 in a like manner to FIG. 1. The RF channel 300 combined with the analogue front end 400 form the analogue channel seen by the digital processing circuitry 500. Conventionally, the digital circuitry is expected to operate error free. However, in an operating mode where a certain rate of errors can be tolerated and are thus allowed to occur, it will be appreciated that, from the perspective of circuitry downstream from the digital processing circuitry 500, the digital processing circuitry 500 itself forms part of an extended channel 370. The analogue front end 400 corresponds substantially to the analogue circuitry 40 described with reference to FIG. 1, and will thus not be described further. The analogue front end 400 converts the received signal into a digital form and outputs it as a stream of data packets to the main digital processing circuitry 500.

As with the digital circuitry 50 of FIG. 1, the main digital processing circuitry 500 of FIG. 2 comprises a channel estimation function 520, which in this case estimates the quality of the channel 350. It will be appreciated that viewed from the main digital processing block 500, distortions in a transmitted signal caused by both the RF channel 300 and the receiver analogue front end 400 are combined to form the channel seen by the main digital processing circuitry 500. As can be understood from the discussion of channel estimation in relation to FIG. 1, in most cases the transmitted signal contains one or more reference signals which are decoded by the main digital processing circuitry, and which are compared with the expected values to yield a channel estimate. The channel estimate is then passed to a controller 860 via channel estimate input line 878. The main digital processing circuitry 500 conducts various digital processing (including the channel estimation) on the digital signal received from the analogue front end 400, and the operation of the digital circuitry this respect is monitored by monitoring circuitry 800. The monitoring circuitry 800 serves to detect the quality of digital processing being carried out by the main digital processing circuitry 500, and output an indication of the digital processing quality to the controller 860 via a quality of digital processing input line 876. The main digital processing circuitry 500 outputs a processed digital signal to a forward error corrector 600, which substantially corresponds to the forward error corrector 60 of FIG. 1. However, in the present example the forward error corrector 600 outputs error metrics indicative of the severity of errors in the digital signal output from the digital processing circuitry 500, and supplies these error metrics to the controller 860 via the error metrics input line 874. The error corrected signal is then checked by error detection circuitry 700 in the manner described above with reference to FIG. 1, and an output signal indicative of whether the packet is in error is supplied to the controller 860 via a packet in error line 872. There are two main approaches to forward error correction and detection. In one approach, such as Reed Solomon, the received vector (signal data) is checked for errors, and only if any errors are found is an attempt made to correct those errors, the success of which is subsequently checked for by the error detection circuit 700. The other approach, such as Viterbi, is based on finding the most probable transmitted vector (signal data), and then checking to see if the most probable vector was in error. It will be appreciated that either or both of these techniques could be implemented.

In this way, enhancement of the quality measurement obtained by the controller 860 is achieved by taking into account error metrics obtained from the forward error correction process, rather than by determining the quality of the output digital signal based purely on whether errors are detected after the forward error correction process. With this enhancement, error metric information is obtained from the forward error corrector 600 stage to provide a measure of how hard it had to work to correct errors. In some cases, such as Reed Solomon, the number of errors corrected can easily be deduced. For most maximum likelihood techniques (such as Viterbi), internal probability measurement are available, for example, from which an assessment of how much more probable the chosen received vector is compared to other possibilities.

The controller 860 is operable to analyse the various performance indicating signals received via the signal lines 872, 874, 876, 878 and determine whether a modification of the current operating parameters of the communications system 2 is required, and if so, to determine which parameters to modify and in what way. In the present example, the operation of the transmit modem 100 can be modified by the controller 860 by supplying the received channel information regarding the channel 350, optionally along with any supplementary instructions, to the transmit modem 100 via an over-air signal path 886. This enables the transmit modem 100 to modify its behaviour in accordance with the actual performance of the channel 350 and/or in accordance with specific supplementary instructions issued by the controller 860. Accordingly, based on receiver back channel information, the transmitter may choose to modify such parameters as the transmit power, data rate, and (for some MIMO protocols) beam forming configuration to reduce the number of receiver errors. As an alternative, the decision making process regarding the need to modify transmission parameters at the transmit modem 100 could be made entirely at the controller 860, in which case the only data to be communicated to the transmit modem 100 via the over-air signal path 886 will be instructions for the transmit modem 100 to modifier its operation.

Furthermore, the controller 860 is operable to modify the operating parameters of the receiver analogue front end 400 to improve the quality of the channel 350 by providing a set of one or more analogue control parameters a signal line 884 between the controller 860 and the receiver analogue front end 400. For example, the sensitivity of the tuner, the level of amplification of the analogue signal, or the coarseness of the automatic gain control process could be adapted in view of the performance of the communications system by specifying new control parameters via the signal line 884. The controller 860 is also operable to modify the operating parameters of the main digital processing circuitry 500. This is achieved by way of parameter control circuitry 830 which is responsive to a set of digital parameters control signal on a signal line 882 between the controller 860 and the parameter control circuitry 830. For example the parameter control circuitry 830 may be responsive to a control signal provided on the signal line 882 to increase or reduce the operating voltage of the main digital processing circuitry 500, and/or to increase or reduce the clock frequency at which the main digital processing circuitry is being driven. Note that forward error correction is extremely computationally intensive, and it is common for the circuits on which it is implemented to be highly optimised and standalone. As such, it is possible to arrange for the forward error corrector 600 and error correction circuit 700 to be run in a separate voltage state to the circuits used for the main digital processing. In one embodiment, the voltage for the FEC circuits can be set such that there is an extremely low probability of processing error.

The present technique extends the standard radio link communication into one which is able to tolerate errors in the digital processing circuits in order to save power by providing facilities to measure digital processing performance of the circuits used for the main digital processing. In its simplest form, the performance measurement may be combined with the results obtained from the error detection circuit to refine both the local and back channel control loops. By tolerating errors in the digital processing, the channel model is effectively extended to include distortions produced by the circuits used by the main digital processing. This additional information can be used to facilitate a reduction in the power consumption of the circuits used for the main digital processing whilst providing an acceptable degree of digital processing performance as measured by the rate of error detection in the corrected output signal.

The basic extensions to manage errors in the circuits used for main digital processing can be augmented by providing means for controlling the main digital circuit operating parameters. Parameters which such a control unit may modify include clock rate and voltage. In its basic form, control decisions used to program this control unit are taken in response to the quality of the output signal and measurements of digital processing performance of the circuits used for the main digital processing. More advanced holistic control algorithms may extend the basic form of control to include performance measurements made by the forward error corrector and the channel estimator described above.

Figure 3:
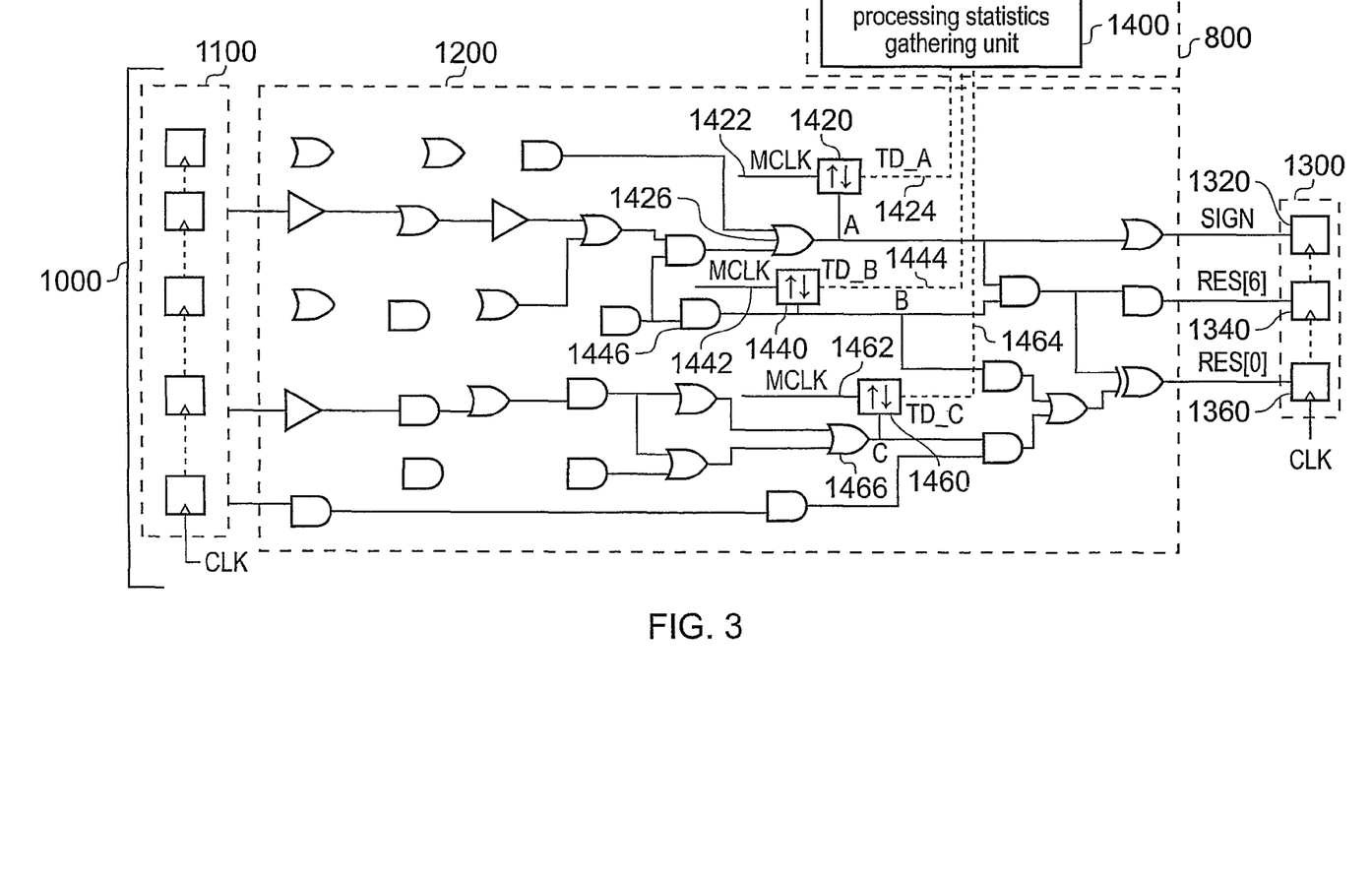
FIG. 3 schematically illustrates a timing error detection circuit.

Referring to FIG. 3, an example portion 1000 of the main digital processing circuitry 500 of FIG. 2 is schematically illustrated. The portion comprises a first set of source registers 1100 which hold values to be operated on, a set of logic gates 1200 for conducting predetermined processing on the content of the first set of source registers 1100, and a second set of destination registers for receiving and storing the result of the processing operation conducted by the set of logic gates 1200. The second set of destination registers 1300 comprise a first register 1320 for storing a sign bit of an output data value, a second register 1340 for storing result bit 6 of the output data value, and a third register 1360 for storing a result bit 0 (least significant bit) of the output data value. For simplicity, the remaining registers storing other output bit values are not shown in FIG. 3. Furthermore, the actual configuration of gates in the set of logic gates 1200 is not intended to represent any particular data processing function and is merely intended to be illustrative of an area of the digital processing circuitry. A portion of the monitoring circuitry 800 is also shown in FIG. 3, and includes a processing statistics gathering unit 1400 for detecting errors occurring in the processing conducted in the processing portion 1200, and for storing statistical data indicative of those errors. In order to be able to gather statistics about the quality of digital processing, the processing statistics gathering unit 1400 monitors the characteristics of the digital processing, which can be used to infer the likelihood of a particular circuit producing an incorrect result. More particularly, the present technique uses in-situ monitoring of signal nodes within the circuit to detect late signal changes, which are indicative of a likelihood of the circuit producing an incorrect result, because a late signal change will arrive at a subsequent processing stage too late to be picked up at the allotted time set by the clock signal, and will thus not be picked up by downstream circuitry. Late signal changes are more likely to happen at lower voltages because signals propagate through the circuitry more slowly. The signal nodes chosen are those which sit on critical paths within the digital processing circuitry. The critical paths are those which are most likely to fail at a low voltage and/or high frequency. The in-situ monitoring is in the present case conducted by transition detector circuits 1420, 1440, 1460 which are connected to the output of logic gates 1426, 1446, 1466 respectively. The transition detector circuits determine whether a signal transition at the output of the respective logic gate occurs during a predetermined time window, in which case it is determined that the critical path through the set of logic gates 1200 up to the output of the respective logic gate 1426, 1446, 1466 is operating too slowly, and thus unreliably. Each of the transition detector circuits 1420, 1440, 1460 sets its predetermined time window in relation to a master clock signal MCLK received on respective input lines 1422, 1442, 1462. If a signal transition is detected by one of the transition detector circuits 1420, 1440, 1460 during its predetermined time window, a late arrival detection signal TD_A, TD_B, TD_C is supplied to the processing statistics gathering unit 1400 on signal lines 1424, 1444, 1464 respectively.

It will be understood that a digital processing circuit has operating parameters, for example supply voltage and maximum clock frequency, which define its safe operating range in which correct operation can be largely guaranteed. If the circuit is operated outside those parameters then errors may occur. It will be appreciated that, as described above, it can sometimes be advantageous to operate a circuit at the lowest possible operating voltage in order to minimise power consumption. However, this will cause an increased failure rate in the data processing operations carried out by that circuit. In a system which does not require that all digital processing is done completely without errors, it is possible to operate the processing logic at a lower voltage than would be required for error free operation, and thus reduce power consumption. As described above, by extending the communication channel concept to incorporate part of the digital processing logic as part of the channel, a digital processing quality metric can be used by the controller 860. This metric is statistical in nature, and is indicative of the level of noise or distortion contributed by incorrect operation of the mail digital processing circuitry 500.

The relationship between distortion level and circuit operation may be dependant on both the type of processing, and the nature of the circuits involved. For example the effect of errors which only effect the least significant bits of a binary coded result, are likely to cause less distortion than an error in the more significant bits. Similarly, a particular algorithm which makes use of many intermediate results may not be significantly affected by an inaccuracy of any order of magnitude in a single intermediate result, but significant distortion could occur if more than one intermediate result is inaccurate.

FIG. 3 shows an arrangement where 3 signal nodes A, B and C are monitored for late changes within the clock cycle. Transition detector circuits are used to detect late changes, and this information is sent to the processing statistics gathering unit, which is used to provide an overall metric of digital processing quality to the system. In this example the signal values at A, B and C are used to create 3 bits of a signed bit binary encoded number, in sign-magnitude format. An error in either the sign bit or a high order bit can cause the result to be significantly inaccurate (e.g −127 instead of +127), whereas an order in the least significant bit will cause less than 1% inaccuracy. The processing statistics gathering unit records the occurrence of late transitions at A, B, and C and creates an overall quality metric depending on the particular significance of any particular node. For example if only late changes were detected in the lowest order bit RES[0] then this might correspond to a high quality level, whereas frequent occurrences of late changes in either the SIGN or RES[6] nodes might correspond to a low quality level.

The quality metric may also take into account the effect of an accumulation of errors from many calculations. Using the above example the quality metric may be related to the number of calculations which may have produced erroneous results. For example rare late changes on node C may not cause any significant distortion, however a large number of late changes could indicate that there is a high probability of accumulated error.

The quality metric may be constructed using samples made over many processing cycles, or many packets. Although the digital process quality metric may be used in conjunction with other channel metrics to change the operating conditions of the digital processing circuits, there is no direct link between the digital processing quality metric and the circuit operating conditions. A low digital processing quality does not automatically mean that the supply voltage be increased, nor does a high digital processing quality imply that the supply voltage will remain the same, or be reduced. It is the overall channel quality that is used to determine the operating conditions of the digital processing circuit, in conjunction with the operating parameters of the other system components.

Figure 4:
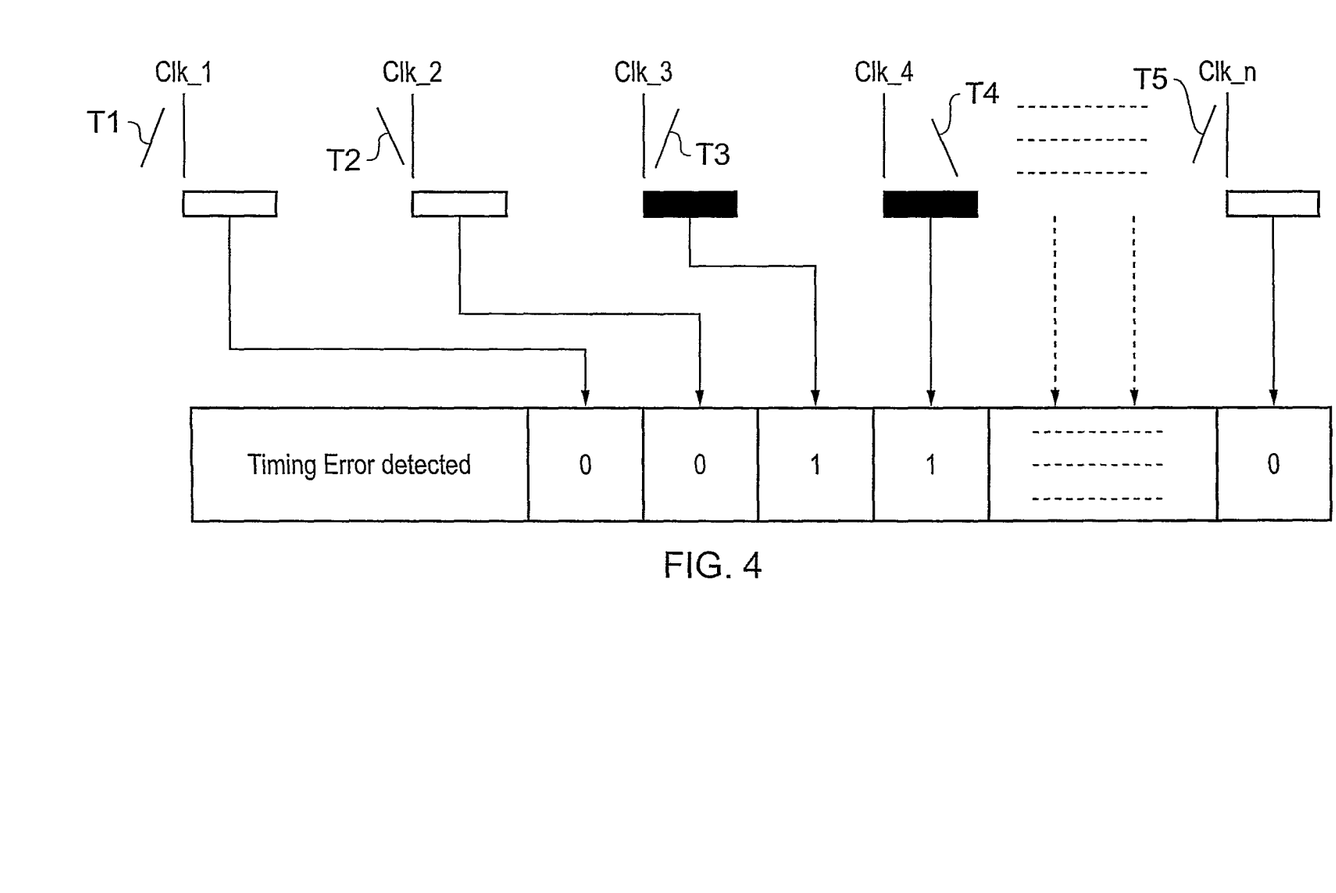
FIG. 4 schematically illustrates the generation of a timing error detected record.

Referring to FIG. 4, the operation of one of the transition detector circuits 1420, 1440, 1460 of FIG. 3 is schematically illustrated over n clock cycles. Clock signals Clk_, Clk_2, Clk_3, Clk_4 and Clk_n are shown, each specifying the start of a clock cycle, and in the present case triggering the start of each of five respective predetermined time windows during which a signal transition will cause a determination of an unreliable critical path. It will be appreciated that while the clock signal provides a reference for the predetermined time window to be set, the start of the predetermined time window need not be coincident with the clock signal. As can be seen from FIG. 4, a signal transition T1 occurs before the start of the predetermined time window associated with Clk_1, and thus the transition detector circuit returns a value of zero (0) into the first cell of the timing error detected record shown at the bottom of FIG. 4. Similarly, a subsequent signal transition T2 occurs before the start of the predetermined time window associated with Clk_2, and thus the transition detector circuit returns a value of zero (0) into the second cell of the timing error detected record. However, the next signal transition T3 occurs during the predetermined time window associated with Clk_3, and so the transition detector returns a value of one (1) into the third cell of the timing error detected record. Similarly, a subsequent signal transition T4 occurs during the predetermined time window associated with Clk_4, and so the transition detector returns a value of one (1) into the fourth cell of the timing error record. Clock signals Clk_5 to Clk_n−1 are omitted from FIG. 4 for clarity, as are the corresponding cells in the timing error detected recorded. However, a signal transition TN occurs before the start of the predetermined time window associated with Clk_n, and thus the transition detector circuit returns a value of zero (0) into the final cell of the timing error detected record. It will be appreciated that the timing record error could include any number of cells to correspond to any desired number of clock signals, and could relate to part of a data packet, a whole data packet, or plural data packets. It will be understood that a timing error detected record can be generated for each transition detector circuit, thus building up a table comprising timing error detected records for each of the transition detector circuits provided within the digital processing circuitry. The timing error detected records could be implemented as a FIFO (first-in-first-out) buffer storing detected transitions in the most recent n clock cycles.

Figure 5A:
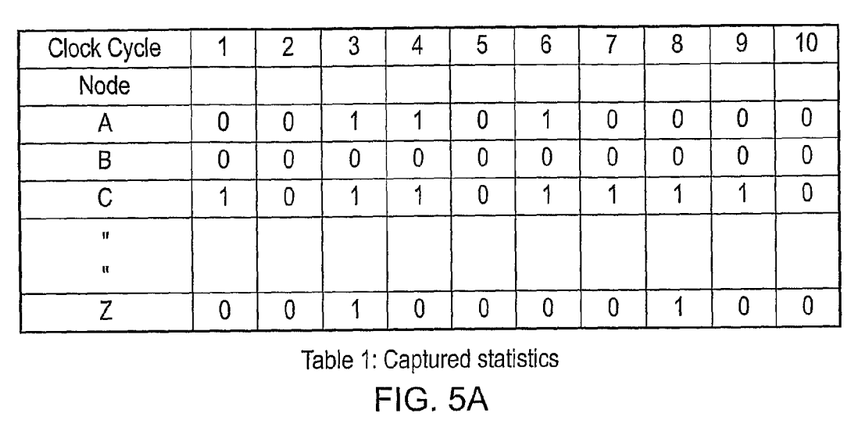
FIGS. 5A and 5B schematically illustrate a table of captured digital performance statistics and metric weighting table respectively.

FIG. 5A schematically illustrates a table of captured statistics such as would be generated by combining timing error detected records for each of a plurality of transition detector circuits. As can be seen from FIG. 5A, timing error detected records for 10 clock cycles are included in the table, for each of transition detector circuits A, B, C and Z. These gathered statistics can be utilised to provide a measure of the quality of digital processing being carried out by the digital processing circuitry.

Figure 5B:
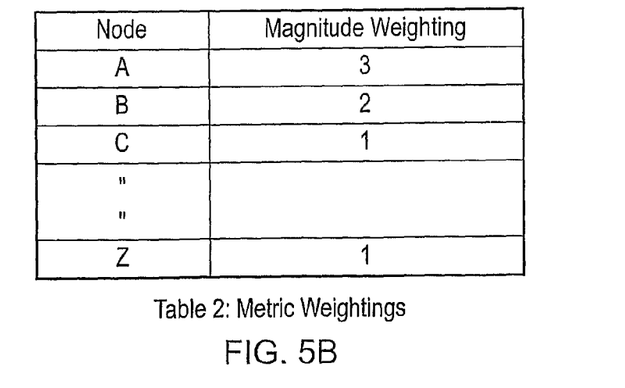

FIG. 5B schematically illustrates a weighting table which indicates, for each of the transition detector circuits, a magnitude weighting M to be applied when generating a quality of processing metric. In particular, a larger magnitude weighting may be applied to a transition detector circuit placed at a node in respect of which a single error would substantially degrade performance. It will be appreciated that performance metrics indicative of the quality of processing being conducted by the digital circuitry could be generated from the table of captured statistics in a number of ways. For example, an intermediate metric could be generated in respect of each timing error detected record by multiplying the number of errors in the timing error detected record by the magnitude weighting. In the example of FIGS. 5A and 5B, this would provide the following results:

Int$A$=3×3=9

Int$B$=0×2=0

Int$C$=7×1=7

Int$Z$=2×1=2

An overall numerical metric could then be calculated as the sum of all the intermediate metrics, giving a value of 9+0+7+2=18. This number could itself represent the performance metric, or could be compared to threshold values to determine a quality of digital process level of, for example, low, medium or high.

While the above-described method of monitoring the quality of digital processing directly measures timing errors in the digital circuitry, which are indicative of likely errors in the resultant data output by the digital processing circuitry, it will be appreciated that other methods of monitoring the quality of digital processing could also be used. For example, a replica circuit representative of the digital circuitry could be provided and operated at the same operating conditions (for example voltage, clock frequency and temperature), and could be monitored for timing errors. Alternatively, the operating conditions of the digital circuitry could be monitored directly and used to infer a likely performance measure.

Figure 6:
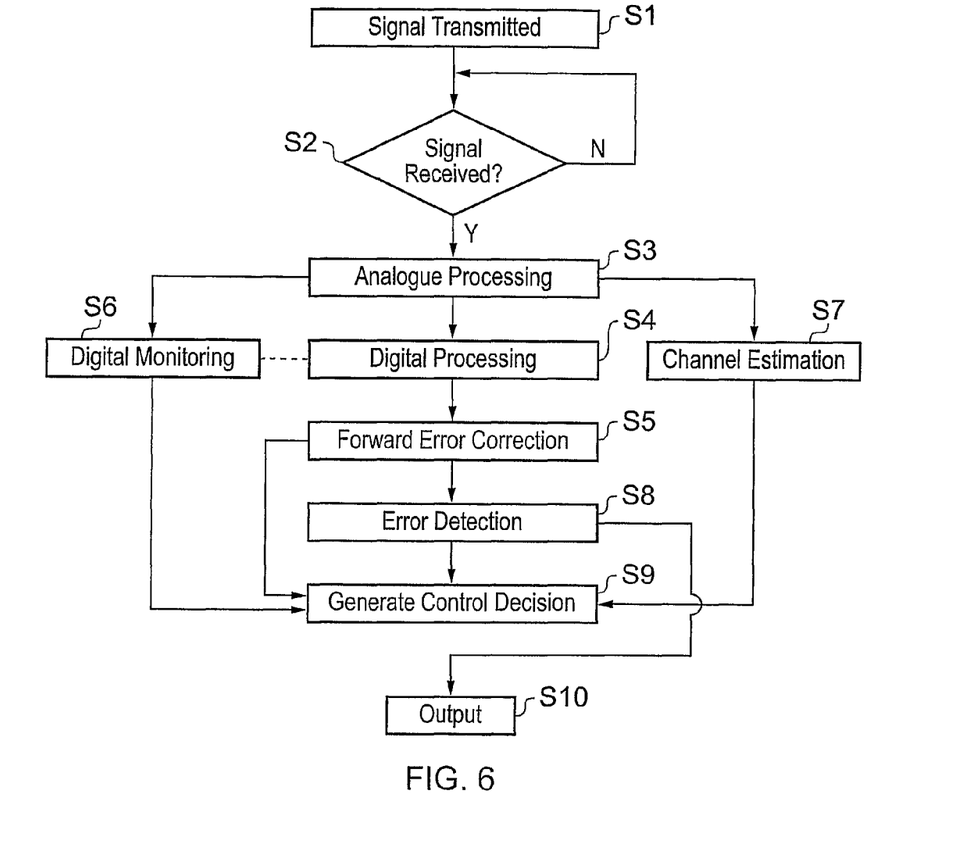
FIG. 6 is a schematic flow diagram illustrating the collection of performance data during processing of data packets.

FIG. 6 presents a, schematic flow diagram illustrating a communications method. The method starts at a step S1 where a data signal is transmitted from a transmitting apparatus. The transmitted data signal is then received at a receiver apparatus at a step S2. The received data signal undergoes analogue processing as described above with reference to FIG. 1 at a step S3, and is converted to a digital signal ready for digital processing at a step S4. At the step S4, the digital signal is processed by digital circuitry to obtain a data packet, and the data packet is then passed to a step S5 to be subject to forward error correction. In parallel with the step S4, the quality of digital processing being conducted at the step S4 is monitored at a step S6, and a resulting quality of digital processing metric is passed to a controller. Also in parallel with the step S4, an estimate of the quality of the analogue channel (transmission channel combined with the performance of the analogue circuitry) is generated at a step S7, and then passed to the controller. At the step S5, the data packet processed at the step S4 is subject to forward error correction to correct errors in the data packet. Also at the step S5, error metrics indicative of the quality of the data packet prior to error correction are passed to the controller. The corrected data packet is passed to a step S8, at which it is determined whether the resulting corrected data packet is with, or without errors. The corrected data packet is then output at a step S10, and a packet in error signal is passed to the controller to indicate whether the outputted packet is error free, or in error. At a step S9, the controller is operable to generate a control decision to modify (or not) the operation of either the transmitting device, the analogue circuitry or the digital circuitry in dependence on the quality of digital processing measured at the step S6, the channel estimate generated at the step S7, the error metrics generated at the step S5, and the packet in error signal generated at the step S8.

Figure 7:
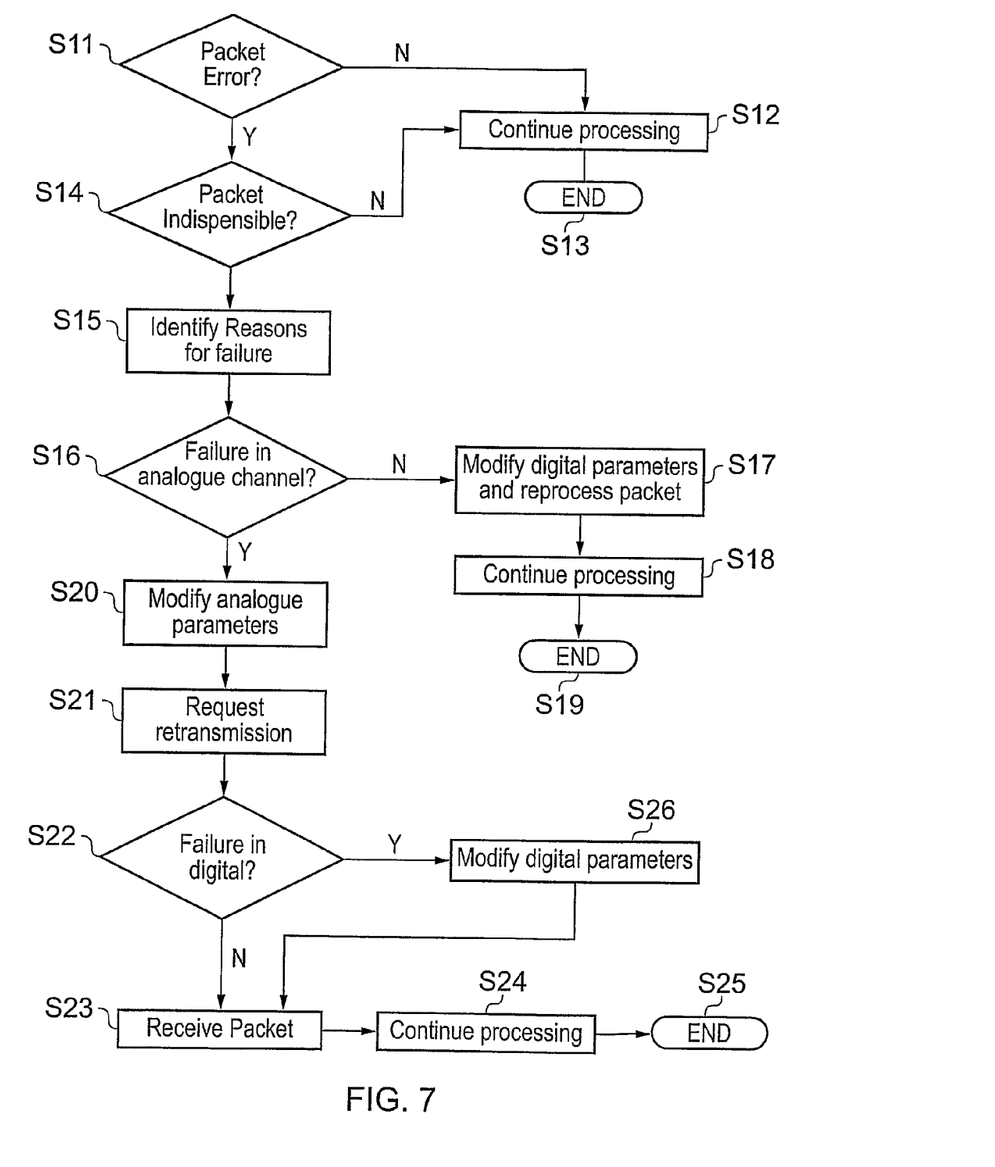
FIG. 7 is a schematic flow diagram illustrating an example process of handling a packet in error.

FIG. 7 schematically illustrates an example decision process for handling packets in error at the step S9 of FIG. 6. At a step S11, the controller determines, from the packet in error signal, whether the data packet being output is error free or in error. If it is determined that the packet is error free, the data packet can be handled normally and normal processing continues at a step S12, with the control process ending at a step S13. If it is determined at the step S11 that the packet is in error, then it is determined at a step S14 whether the packet in error is indispensable. If the packet in error is determined not to be indispensable, then the packet is ignored and the process returns to the step S12. If however it is determined at the step S14 that the packet is indispensable, then the reason for the failure is identified at a step S15 based on the error metrics from the forward error corrector, the digital processing quality and the channel estimate. At a step S16 it is decided whether the failure resulted at least in part from the transmission channel, and if so the process moves on to a step S20, where the analogue parameters of the analogue circuitry are modified to improve performance, and then to a step S21, where a request is made to the transmitting apparatus for retransmission of the failed data packet. Optionally this request will include an instruction to modify the transmission parameters when sending the data packet to provide more robust transmission. At a step S22 it is determined whether the failure resulted at least in part from the operation of the digital circuitry, and if so the process moves on to a step S26 where the digital parameters are modified to improve the quality of digital processing performance. Then, at a step S23 the retransmitted packet is received and processed using the modified analogue and/or digital and/or transmission parameters. Processing then continues at a step S24, and the process ends at a step S25.

Figure 8:
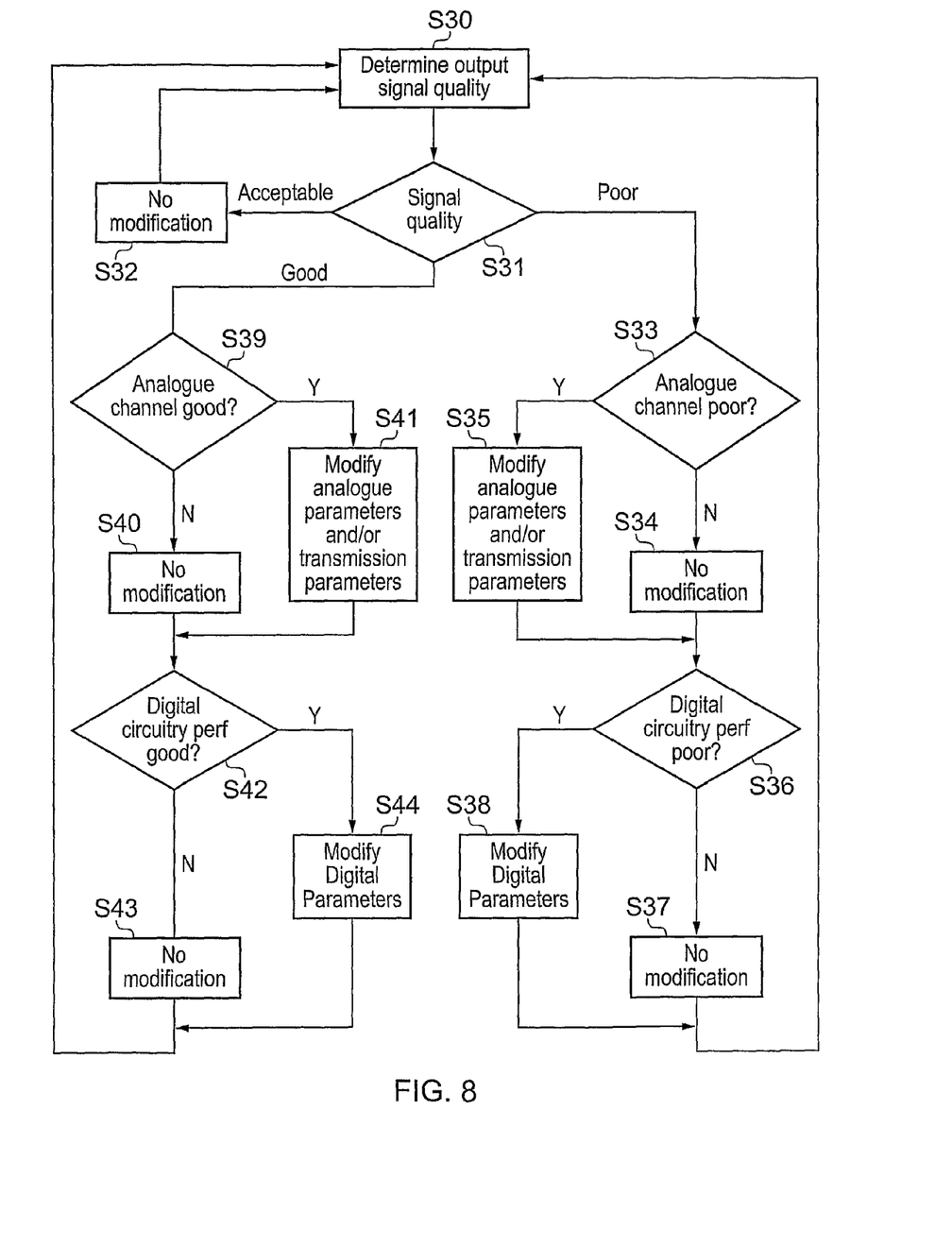
FIG. 8 is a schematic flow diagram illustrating an example process of dynamically modifying the operation of the communications system in dependence on collected performance data.

FIG. 8 is a schematic flow diagram which illustrates how the operation of the communications system can be modified dynamically in dependence on the output signal quality (packet error rate and forward error correction error metrics), the channel estimate, and the measured quality of digital processing. The process commences at a step S30 where the output signal quality is determined from one or both of the packet error rate measured by the error detection circuitry and the error metrics generated by the forward error corrector. At a step S31 it is determined whether the output signal quality is good, acceptable, or poor. In the case of acceptable performance, the process moves on to a step S32 where it is determined that no modification of system parameters is required, whereby the output signal quality continues to be monitored at the step S30.

If at the step S31 it is determined that the signal quality is poor, then it is desirable to improve the performance of the communications system as a whole to obtain a better quality output signal. To achieve this, the process moves on to a step S33 where it is determined whether the quality of the analogue channel is poor based on the channel estimate generated by the digital processing circuitry. If it is determined at the step S33 that the quality of the analogue channel is not poor, then the process progresses to a step S34 where it is determined that no modification of the analogue channel is required. If however it is determined at the step S33 that the quality of the analogue channel is poor, then the analogue parameters of the analogue circuitry are modified by the controller and/or a control signal is communicated back to the transmitting apparatus to control the transmitting apparatus to modify the transmission parameters by for example increasing the transmission power, reducing the data rate, or switching from a single antenna to multiple antennae transmission mode. Following the step S34 or S35, it is determined at a step S36 whether the quality of digital processing conducted by the digital circuitry is poor based on the monitored digital processing quality. If it is determined at the step S36 that the quality of digital processing is not poor, then the process progress to a step S37 where it is determined that no modification of the digital processing parameters is required. If however it is determined at the step S36 that the quality of digital processing is poor, then one or more of the digital parameters controlling the operation of the digital processing circuitry are modified at a step S38 for example to increase the operating voltage and/or reduce the clock frequency of the digital circuitry. Following the step S37 or S38, the process returns to the step S30 where the output signal quality continues to be monitored.

If at the step S31 it is determined that the signal quality is good, then it becomes possible to intentionally degrade the accuracy of the communications system to either increase the rate of operation or decrease the amount of power used. To achieve this, the process moves on to a step S39 where it is determined whether the quality of the analogue channel is good based on the channel estimate generated by the digital processing circuitry. If it is determined at the step S39 that the quality of the analogue channel is not good, then the process progresses to a step S40 where it is determined that no modification of the analogue channel should be conducted. This is because modifying the parameters to reduce the performance of an analogue channel which is already either behaving poorly or acceptably would be likely to result in an unacceptable increase in the error rate. If however it is determined at the step S39 that the quality of the analogue channel is good, then the analogue parameters of the analogue circuitry are modified by the controller at a step S41 to increase the rate of processing (for example by performing automatic gain control more coarsely) or to decrease the power usage (for example by reducing the amount of signal amplification applied) and/or a control signal is communicated back to the transmitting apparatus to control the transmitting apparatus to modify the transmission parameters (for example by increasing the transmission power, or by switching from a single antennae transmission mode to a MIMO mode). Following the step S40 or S41, it is determined at a step S42 whether the quality of digital processing conducted by the digital circuitry is good based on the monitored digital processing quality. If it is determined at the step S42 that the quality of digital processing is not good, then the process progresses to a step S43 where it is determined that no modification of the digital processing parameters is appropriate, because a further reduction in the quality of digital processing would be likely to cause an unacceptable increase in the error rate. If however it is determined at the step S43 that the quality of digital processing is good, then one or more of the digital parameters controlling the operation of the digital processing circuitry are modified at a step S44. For example, the clock frequency at which the digital processing circuitry operates could be increased to improve the speed of processing and/or the operating voltage of the digital circuitry could be reduced to save power. Following the step S43 or S44, the process returns to the step S30 where the output signal quality continues to be monitored.

The example of FIG. 8 demonstrates, for the sake of clarity, a relatively simple implementation of a control method utilising various quality inputs. However, it will be appreciated that the output signal quality, channel estimate and quality of digital processing could be utilised in many other ways to optimise and regulate the performance of the communications system.

Various further aspects and features of the present invention are defined in the appended claims. Various modifications can be made to the embodiments herein before described without departing from the scope of the present invention.

The invention claimed is:

1. An electronic device for receiving packetized data from a transmitting device via a communications channel, the electronic device comprising:
    digital processing circuitry arranged to process the data received via the communications channel to generate output data;
    error detection circuitry arranged to detect whether a packet of the output data is correct or in error;
    monitoring circuitry arranged to monitor the quality of digital processing conducted by the digital processing circuitry by monitoring signal nodes within the digital processing circuitry and detecting timing errors in signal transitions at the monitored signal nodes, and to generate digital performance data indicative of the monitored quality of digital processing based on the timing errors detected at the monitored signal nodes; and
    control circuitry responsive to the detection by the error detection circuitry of a packet of output data which is in error to determine, from the performance data generated by the monitoring circuitry, whether or not any timing errors were present during digital processing of the packetized data by the digital processing circuitry, and to modify the operation of one or both of the transmitting device and the electronic device in dependence on whether timing errors were determined during the digital processing.

2. An electronic device according to claim 1, wherein the packetized data comprises error correction codes, and wherein the electronic device comprises error correction circuitry for correcting errors in the output data using the error correction codes, the error detection circuitry being arranged to detect whether a packet of the corrected output data is correct or in error.

3. An electronic device according to claim 2, wherein the error correction circuitry is arranged to generate error metrics indicative of the severity of errors in the digital signal being corrected, and wherein the error information comprises the error metrics generated by the error correction circuitry.

4. An electronic device according to claim 1, comprising analogue circuitry arranged to receive the data transmitted from the transmitting apparatus via the communications channel in analogue form, convert the received analogue data into digital form, and provide the data in digital form to the digital processing circuitry;
wherein the digital processing circuitry comprises a channel estimator arranged to estimate channel characteristics of the communications channel and the analogue circuitry and provide the estimated channel characteristics to the control circuitry; and wherein the error information comprises the estimated channel characteristics.

5. An electronic device according to claim 4, wherein the control circuitry is responsive to the error information to modify an operating parameter of at least a portion of the analogue circuitry.

6. An electronic device according to claim 1, wherein the control circuitry is responsive to the error information to modify an operating parameter of at least a portion of the digital processing circuitry.

7. An electronic device according to claim 6, wherein said operating parameter is one of an operating voltage and a clock frequency.

8. An electronic device according to claim 7, wherein the control circuitry is arranged to reduce the operating voltage and/or increase the clock frequency of the digital processing circuitry when the error information indicates that this will not cause an unacceptable error rate in the output data.

9. An electronic device according to claim 1, wherein the control circuitry is responsive to the error information to modify one or more data transmission parameters used by the transmitting device to transmit the data via the communications channel.

10. An electronic device according to claim 9, wherein the data transmission parameter modified by the control circuitry is one of a data transmission rate and a mode parameter for selecting between a single antennae transmission mode and a multiple antennae transmission mode.

11. An electronic device according to claim 1, wherein the control circuitry is responsive to the error information to request the transmitting device to resend data.

12. An electronic device according to claim 1, wherein the control circuitry is responsive to the error information to control the digital processing circuitry to reprocess data.

13. An electronic device according to claim 1, wherein the monitoring circuitry is arranged to monitor the quality of digital processing by detecting timing errors in the digital processing circuitry and generate the digital performance data based on the number of detected timing errors.

14. An electronic device according to claim 1, wherein the digital performance data is generated based on the temporal and/or spatial distribution of the detected timing errors.

15. An electronic device according to claim 4, wherein the control circuitry is responsive to error information indicating that the data packet is in error to control the digital circuitry to reprocess the packetized data provided to the digital processing circuitry by the analogue circuitry if the estimated channel characteristics indicate an acceptable channel quality.

16. An electronic device according to claim 15, wherein the control circuitry controls the digital circuitry to reprocess the data packet using modified operating parameters if the digital performance data indicates an unacceptable quality of digital processing.

17. An electronic device according to claim 4, wherein the control circuitry is responsive to error information indicating that the data packet is in error to request transmission of a replacement data packet from the transmitting device if the estimated channel characteristics indicate an unacceptable channel quality and the digital performance data indicates an acceptable quality of digital processing.

18. An electronic device according to claim 17, wherein the control circuitry requests transmission of a replacement data packet from the transmitting device using modified transmission parameters.

19. A receiving method of receiving packetized data at an electronic device from a transmitting device via a communications channel, the method comprising the steps of:
digitally processing the data received via the communications channel at digital processing circuitry to generate output data;
monitoring the quality of digital processing by monitoring signal nodes within the digital processing circuitry and detecting timing errors in signal transitions at the monitored signal nodes, and generating digital performance data indicative of the monitored quality of digital processing based on the timing errors detected at the monitored signal nodes;
detecting whether a packet of the output data is correct or in error;
in response to the detection of a packet of output data which is in error, determining from the performance data generated by monitoring the signal nodes whether or not any timing errors were present during the digital processing of the packetized data; and
modifying the operation of one or both of the transmitting device and the electronic device responsive to error information comprising detected errors in the output data and the digital performance data in dependence on whether timing errors were determined to be present during the digital processing.

20. A non-transitory computer-readable storage medium comprising a computer program which when executed a computer causes the computer to execute a receiving method according to claim 19.

* * * * *